(12) United States Patent
Yoshizawa

(10) Patent No.: US 11,705,819 B2
(45) Date of Patent: Jul. 18, 2023

(54) INTEGRATED CIRCUIT AND POWER SUPPLY CIRCUIT

(71) Applicant: FUJI ELECTRIC CO., LTD., Kawasaki (JP)

(72) Inventor: Tsuyoshi Yoshizawa, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 79 days.

(21) Appl. No.: 17/355,940

(22) Filed: Jun. 23, 2021

(65) Prior Publication Data

US 2022/0060118 A1 Feb. 24, 2022

(30) Foreign Application Priority Data

Aug. 24, 2020 (JP) ................................ 2020-140894

(51) Int. Cl.
*H02M 3/335* (2006.01)
*H02M 1/00* (2006.01)
*H02M 1/08* (2006.01)

(52) U.S. Cl.
CPC ..... *H02M 3/33576* (2013.01); *H02M 1/0025* (2021.05); *H02M 1/0035* (2021.05); *H02M 1/08* (2013.01)

(58) Field of Classification Search
CPC ........... H02M 3/33576; H02M 1/0025; H02M 1/0035; H02M 1/08; H02M 1/0009; H02M 3/01
See application file for complete search history.

(56) References Cited

U.S. PATENT DOCUMENTS

| 9,929,661 B2* | 3/2018 | Chen ....................... H02M 1/36 |
| 2017/0110974 A1* | 4/2017 | Chen ....................... H02M 1/08 |
| 2017/0155333 A1* | 6/2017 | Chen ....................... H02M 1/36 |

FOREIGN PATENT DOCUMENTS

| JP | 2017-103889 A | 6/2017 |
| JP | 6229804 B2 | 11/2017 |
| JP | 2020-058213 A | 4/2020 |

* cited by examiner

*Primary Examiner* — Kyle J Moody
(74) *Attorney, Agent, or Firm* — Rabin & Berdo, P.C.

(57) ABSTRACT

An integrated circuit for a power supply circuit configured to generate an output voltage at a target level. The power supply circuit includes a transistor configured to control an inductor current flowing through an inductor. The integrated circuit includes a load detection circuit outputting a detection voltage corresponding to a power consumption of a load and corresponding to an operation mode of the power supply circuit, based on the inductor current, a driver circuit driving the transistor according to the operation mode of the power supply circuit, and a control circuit configured to control the driver circuit to switch the power supply circuit to a second mode upon the detection voltage reaching a first level with a decrease in the power consumption of the load, and to a first mode upon the detection voltage reaching a second level with an increase in the power consumption of the load.

11 Claims, 12 Drawing Sheets

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2020-140894 filed on Aug. 24, 2020, the entire disclosure of which is hereby incorporated by reference herein.

BACKGROUND

Technical Field

The present disclosure relates to an integrated circuit and a power supply circuit.

Description of the Related Art

Integrated circuits configured to control power supply circuits include those configured to drive power transistors in an operation mode corresponding to power consumptions of loads (for example, Japanese Patent No. 6229804, Japanese Patent Application Publication No. 2017-103889).

Such an integrated circuit as described above commonly includes a load detection circuit configured to output a detection voltage that rises with an increase in a power consumption of a load. Then, the integrated circuit changes the operation mode of the power supply circuit between a normal mode and a light load mode, based on whether the detection voltage reaches a predetermined level.

However, in such an integrated circuit, if the predetermined level is set high, the change from the light load mode to the normal mode may be delayed, and an output voltage of the power supply circuit may drop. On the other hand, the predetermined level is set low, the change from the normal mode to the light load mode may be delayed, and efficiency of the power supply circuit may deteriorate. Accordingly, such an integrated circuit is not able to appropriately operate the power supply circuit according to a plurality of modes.

The present disclosure is directed to provision of an integrated circuit capable of appropriately operating a power supply circuit according to a plurality of modes.

SUMMARY

An aspect of the present disclosure is an integrated circuit for a power supply circuit configured to generate an output voltage at a target level from an input voltage inputted thereto, the power supply circuit including an inductor, and a transistor configured to control an inductor current flowing through the inductor, the integrated circuit being configured to control and switch the transistor, the power supply circuit being configured to operate in an operation mode that is a first mode or a second mode, the integrated circuit comprising: a load detection circuit configured to output a detection voltage corresponding to a power consumption of a load of the power supply circuit and corresponding to the operation mode of the power supply circuit, based on the inductor current; a driver circuit configured to drive the transistor according to the operation mode of the power supply circuit; and a control circuit configured to so control the driver circuit that the power supply circuit operates in the second mode upon the detection voltage reaching a first level with a decrease in the power consumption of the load, when the power supply circuit operates in the first mode, and the power supply circuit operates in the first mode upon the detection voltage reaching a second level with an increase in the power consumption of the load, when the power supply circuit operates in the second mode.

Another aspect of the present disclosure is a power supply circuit configured to generate an output voltage at a target level from an input voltage inputted thereto, the power supply circuit being configured to operate in an operation mode that is a first mode or a second mode, the power supply circuit comprising: an inductor; a transistor configured to control an inductor current flowing through the inductor; and an integrated circuit configured to switch the transistor, the integrated circuit including a load detection circuit configured to output a detection voltage corresponding to a power consumption of a load of the power supply circuit and corresponding to the operation mode of the power supply circuit, based on the inductor current, a driver circuit configured to drive the transistor according to the operation mode of the power supply circuit, and a control circuit configured to so control the driver circuit that the power supply circuit operates in the second mode upon the detection voltage reaching a first level with a decrease in the power consumption of the load when the power supply circuit operates in the first mode, and the power supply circuit operates in the first mode upon the detection voltage reaching a second level with an increase in the power consumption of the load when the power supply circuit operates in the second mode.

DETAILED DESCRIPTION

At least following matters will become apparent from the description of the present specification and the accompanying drawings.

Embodiments

<<<Outline of Switching Power Supply Circuit 10>>>

Figure 1:
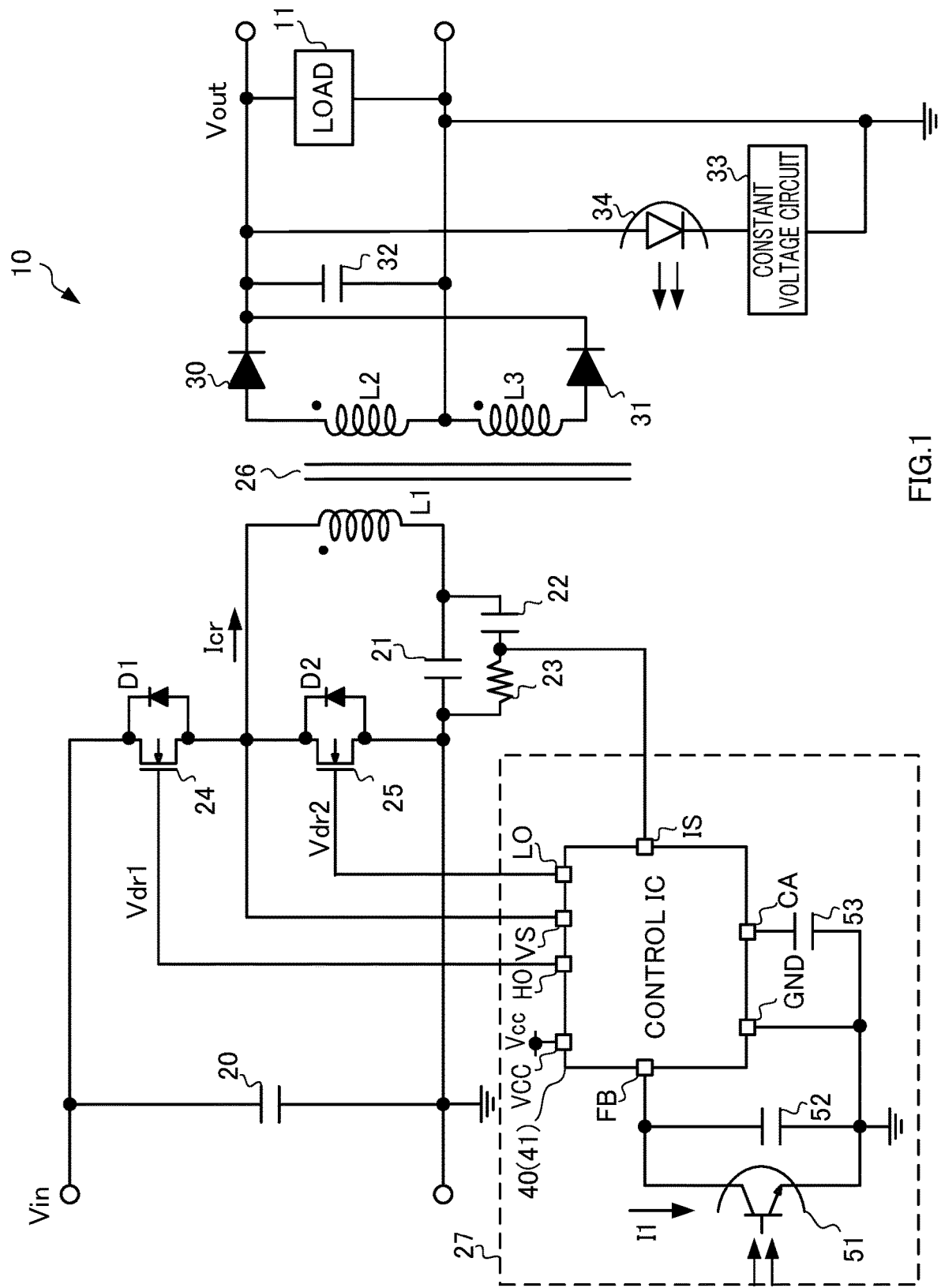
FIG. 1 is a diagram illustrating one example of a switching power supply circuit 10.

FIG. 1 is a diagram illustrating one example of a configuration of a switching power supply circuit 10 according to one embodiment of the present disclosure. The switching power supply circuit 10 is an LLC current resonant converter that generates an output voltage Vout of a target level at a load 11 from a predetermined input voltage Vin.

The switching power supply circuit 10 comprises capacitors 20, 21, 22, 32, a resistor 23, n-type metal-oxide-semiconductor (NMOS) transistors 24, 25, a transformer 26, a control block 27, diodes 30, 31, a constant voltage circuit 33, and a light emitting diode 34.

The capacitor 20 stabilizes the voltage between a power supply line, to which the input voltage Vin is applied, and a ground line on the ground side, and removes noise and the like. Note that the input voltage Vin is a direct-current (DC) voltage at a predetermined level. The capacitor 21 is a so-called resonant capacitor that configures a resonant circuit with a leakage inductance between a primary coil L1 and secondary coils L2, L3.

The capacitor 22 and the resistor 23 configure a circuit that detects a resonant current Icr flowing through the capacitor 21. The capacitor 22 and the resistor 23 coupled in series are coupled in parallel with the capacitor 21. Note that the resonant current Icr that flows in a direction of an arrow illustrated in FIG. 1 is referred to as the positive resonant current Icr.

The NMOS transistors 24 is a high-side power transistor, and the NMOS transistor 25 is a low-side power transistor. Note that the NMOS transistors 24, 25 are used as switching devices in an embodiment of the present disclosure, however, for example, PMOS transistors or bipolar transistors may be used.

The transformer 26 comprises the primary coil L1 and the secondary coils L2, L3, and the primary coil L1 is insulated from the secondary coils L2, L3. In the transformer 26, voltage is generated in the secondary coils L2, L3 on the secondary side according to a variation in the voltage across the primary coil L1 on the primary side.

Further, the primary coil L1 has one end coupled to the source of the NMOS transistor 24 and the drain of the NMOS transistor 25, and the other end coupled to the source of the NMOS transistor 25 via the capacitor 21.

Accordingly, when switching of the NMOS transistors 24, 25 is started, the voltage in each of the secondary coils L2, L3 varies. Note that the primary coil L1 and the secondary coils L2, L3 are magnetically coupled with the same polarity.

The control block 27 is a circuit block for controlling switching of the NMOS transistors 24, 25, and details thereof will be described later.

The diodes 30, 31 rectify the voltage in the secondary coils L2, L3, and the capacitor 32 smooths the rectified voltage. As a result, the smoothed output voltage Vout is generated in the capacitor 32. Note that the output voltage Vout results in a DC voltage of a target level.

The constant voltage circuit 33 generates a constant DC voltage, and is configured using a shunt regulator, for example.

The light emitting diode 34 is a device that emits light having an intensity corresponding to a difference between the output voltage Vout and the output of the constant voltage circuit 33, and configures a photocoupler with a phototransistor 51 which will be described later. In an embodiment of the present disclosure, as the level of the output voltage Vout rises, the intensity of the light emitted from the light emitting diode 34 increases.

Note that the primary coil L1 of the transformer 26 corresponds to an "inductor", the resonant current Icr corresponds to an "inductor current", at least the NMOS transistors 24 corresponds to a "transistor".

<<<Control Block 27>>>

The control block 27 includes a control IC 40, capacitors 52, 53, and a phototransistor 51.

The control IC 40 is an integrated circuit that controls switching of the NMOS transistors 24, 25, and has terminals VCC, GND, FB, IS, CA, HO, LO, VS.

The terminal VCC is a terminal to which a power supply voltage Vcc for operating the control IC 40 is to be applied. Although not illustrated, the terminal VCC is coupled to one end of a capacitor having the other end grounded, and to the cathode of a diode. The voltage from an auxiliary coil (not shown) of the transformer 26 is charged to the capacitor, resulting in the voltage Vcc. Note that the control IC 40 is activated by being applied with a divided voltage of the input voltage Vin obtained by rectifying an alternating-current (AC) input via a terminal not illustrated, and after activation, the control IC 40 operates based on the power supply voltage Vcc.

The terminal GND is a terminal to which a ground voltage is to be applied, and is coupled to a housing or the like of a device in which the switching power supply circuit 10 is provided, for example.

The terminal FB is a terminal at which a feedback voltage Vfb corresponding to the output voltage Vout is generated, and to which the phototransistor 51 and the capacitor 52 are coupled. The capacitor 52 is provided to remove noise between the terminal FB and the ground, and the phototransistor 51 passes a bias current I1 having a magnitude corresponding to the intensity of the light emitted from the light emitting diode 34, from the terminal FB to the ground. Thus, the phototransistor 51 operates as a transistor that generates a sink current.

The terminal IS is a terminal for detecting a current value of the resonant current of the primary coil L1. Here, at the node at which the capacitor 22 and the resistor 23 are coupled, a voltage corresponding to the current value of the resonant current of the primary coil L1 is generated. Accordingly, the terminal IS receives a voltage corresponding to the current value of the resonant current of the primary coil L1.

The terminal CA is a terminal that receives a voltage Vca that is generated based on the resonant current of the primary coil L1 and that corresponds to the input power of the switching power supply circuit 10. As will be described later in detail, the capacitor 53 is coupled to the terminal CA.

The terminal HO is a terminal from which a signal Vdr1 for driving the NMOS transistor 24 is outputted, and to which the gate of the NMOS transistor 24 is coupled.

The terminal LO is a terminal from which a signal Vdr2 for driving the NMOS transistor 25 is outputted, and to which the gate of the NMOS transistor 25 is coupled.

The terminal VS receives the voltage at the connection point between the NMOS transistors 24 and 25, and receives the voltage Vin upon turning on of the NMOS transistors 24, and receives the ground voltage upon turning on of the NMOS transistor 25.

<<<Details of the Control IC 40>>>

Figure 2:
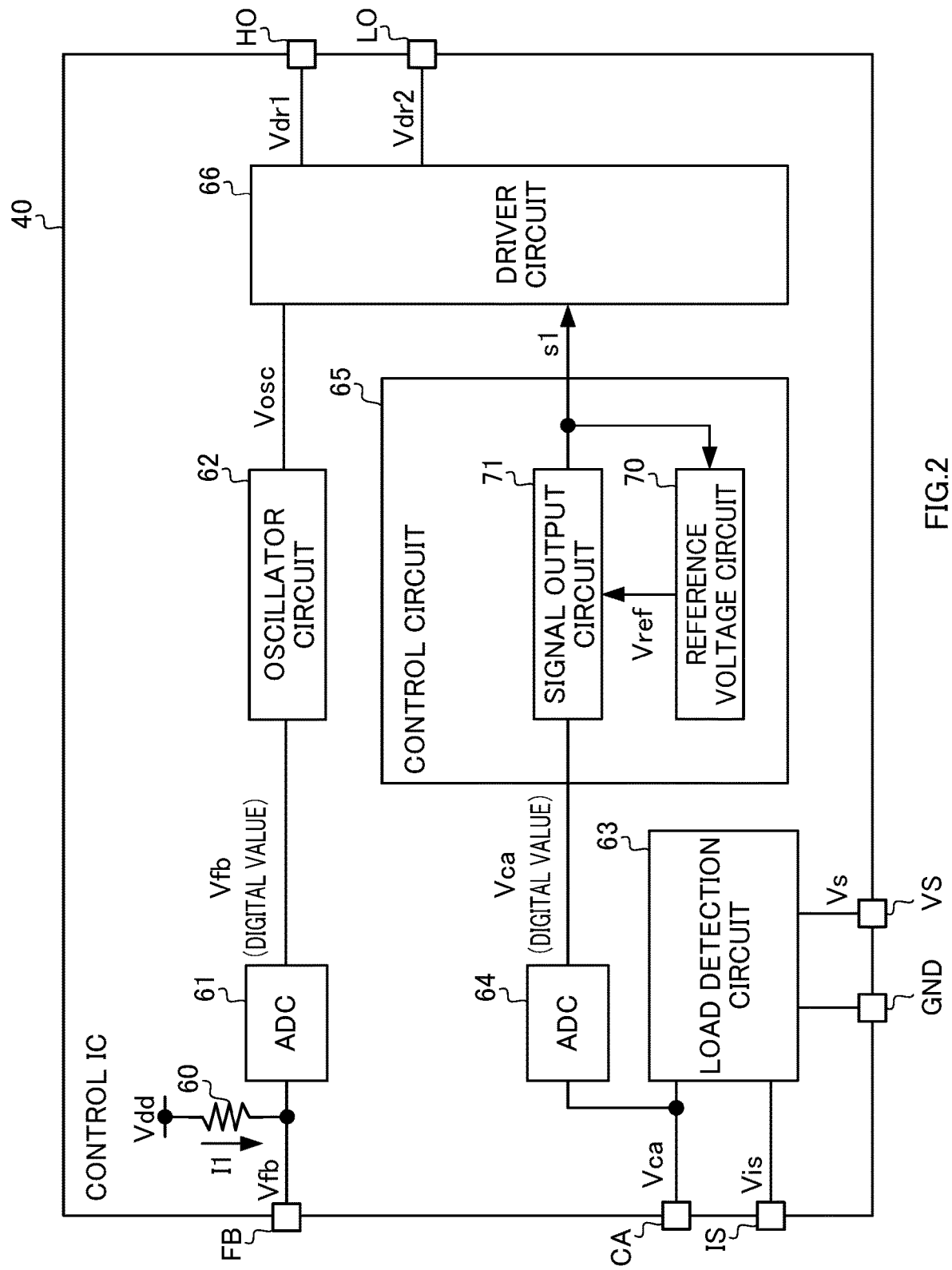
FIG. 2 is a diagram illustrating one example of a control IC 40.

FIG. 2 is a diagram illustrating one example of the control IC 40. The control IC 40 is an integrated circuit that drives the transistors in an appropriate operation mode based on the voltage Vca corresponding to the inductor current. The control IC 40 comprises a resistor 60, analog-to-digital converters (ADC) 61, 64, an oscillator circuit 62, a load detection circuit 63, a control circuit 65, and a driver circuit 66. Note that the terminal VCC is omitted here, for convenience.

The resistor 60 generates the feedback voltage Vfb based on the bias current I1 from the phototransistor 51. Note that the resistor 60 has one end to which a predetermined voltage Vdd is applied, and the other end coupled with the terminal FB. Accordingly, the feedback voltage Vfb generated at the terminal FB is given by Expression (1).

$$Vfb = Vdd - R \times I1 \quad (1)$$

where "R" is the resistance value of the resistor 60. As described above, in an embodiment of the present disclosure, the current value of the bias current I1 increases with a rise in the output voltage Vout. Accordingly, when the output voltage Vout rises, the feedback voltage Vfb drops.

The ADC 61 converts the feedback voltage Vfb at terminal FB into a digital value, and outputs the resultant. Note that, hereinafter, the digitized feedback voltage Vfb is also referred to as the feedback voltage Vfb.

The oscillator circuit 62 is a voltage control oscillator circuit that outputs, to the driver circuit 66 (described later), an oscillator signal Vosc for switching the NMOS transistors 24, 25, based on the feedback voltage Vfb inputted thereto. The oscillator signal Vosc has, for example, 50% duty cycle of a high level (hereinafter, referred to as high or high level). Note that the oscillator circuit 62 outputs the oscillator signal Vosc having a high frequency when the level of the voltage Vfb drops.

The load detection circuit 63 averages the voltage according to the resonant current of the primary coil L1 detected at the terminal IS using the capacitor 53 coupled to the terminal CA, and outputs the resultant as the voltage Vca according to the power consumption PL of the load 11. The details will be described later.

The ADC 64 converts the voltage Vca outputted by the load detection circuit 63 into a digital value, and outputs the resultant. Note that, hereinafter, the digitized voltage Vca is also referred to as the voltage Vca.

The control circuit 65 outputs a mode signal s1 indicating the "operation mode" of the switching power supply circuit 10 to the driver circuit 66 based on the voltage Vca, and comprises a reference voltage circuit 70 and a signal output circuit 71. Further, the control circuit 65 is a digital circuit that processes a digital signal based on the digitized voltage Vca. Note that the mode signal s1 may be a signal represented by a logic level of a high level or low level (hereinafter, referred to as low or low level), or data with a predetermined number of bits. The reference voltage circuit 70 and the signal output circuit 71 will be described later in detail.

The driver circuit 66 drives the NMOS transistors 24, 25 based on the oscillator signal Vosc and the mode signal s1. Specifically, the driver circuit 66 continuously drives the NMOS transistors 24, 25 in response to the oscillator signal Vosc, based on the mode signal s1 indicating a "normal mode".

In addition, the driver circuit 66 intermittently drives the NMOS transistors 24, 25 in response to the oscillator signal Vosc, based on the mode signal s1 indicating a "light load mode". Although details thereof will be described later, the switching power supply circuit 10 according to an embodiment of the present disclosure has two "operation modes" which are the "normal mode" and the "light load mode".

<<<<Drive Signals Vdr1, Vdr2 in "Normal Mode" or "Light Load Mode">>>>

Figure 3:
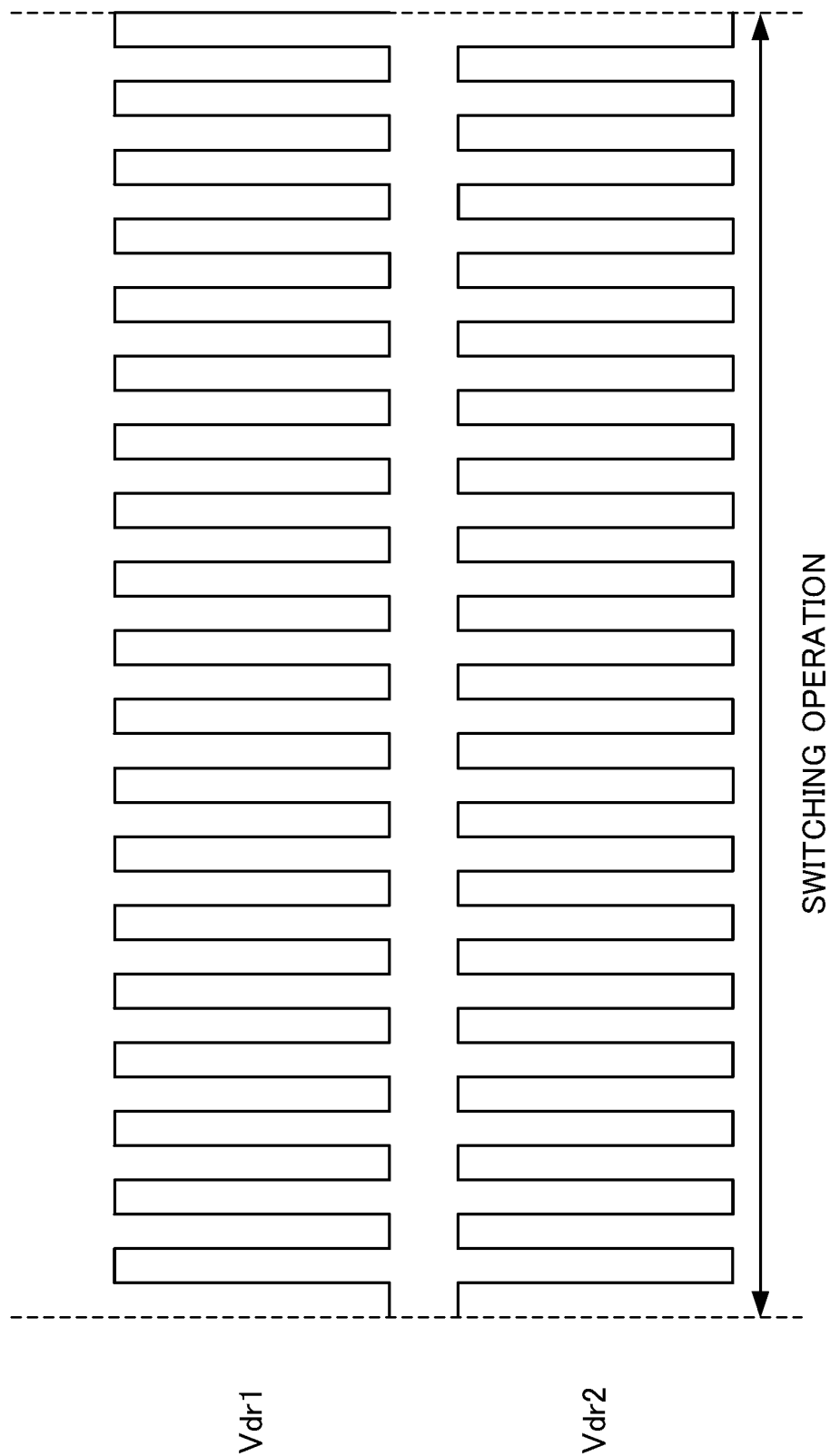
FIG. 3 is a diagram illustrating one example of drive signals Vdr1, Vdr2 in a "normal mode".
Figure 4:
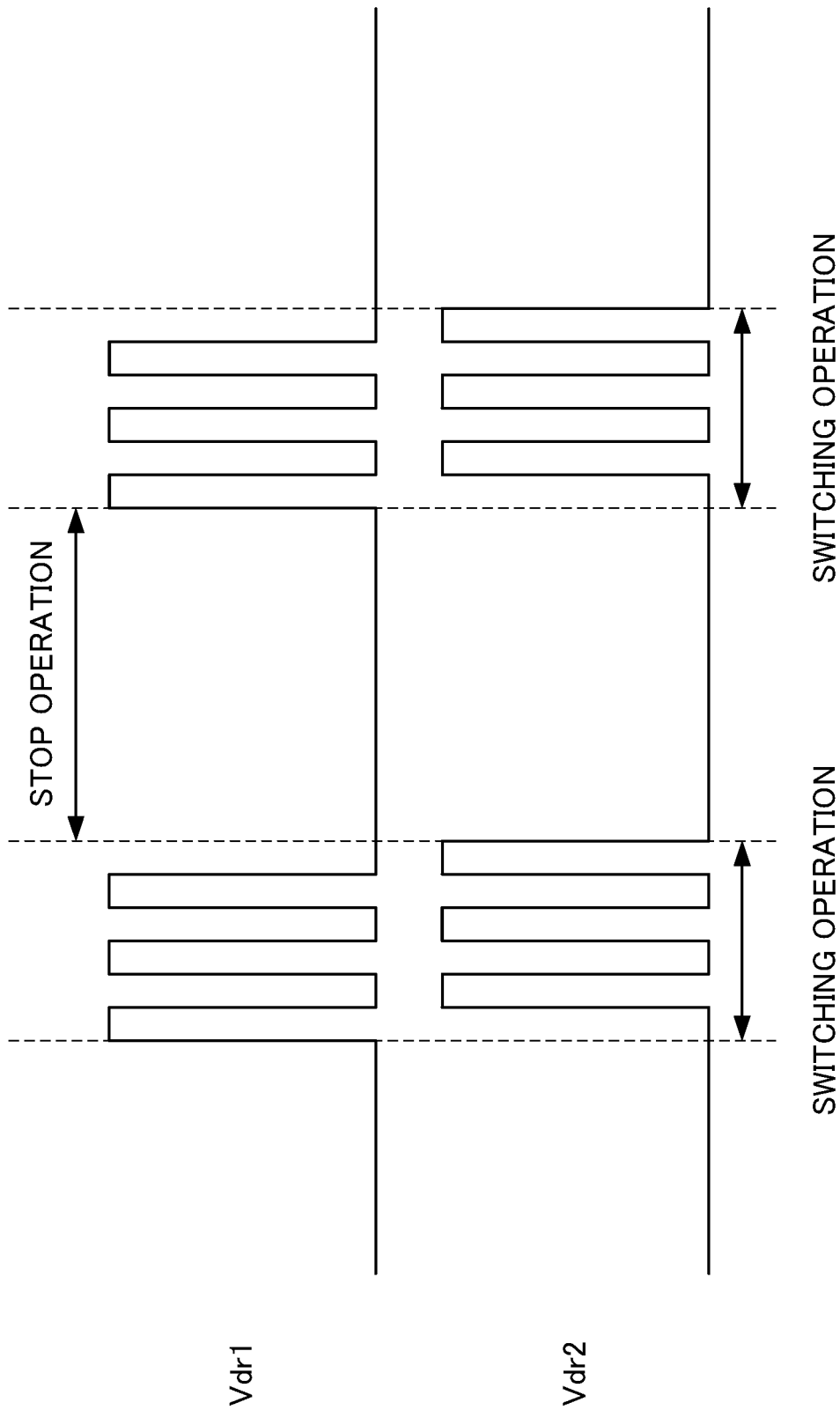
FIG. 4 is a diagram illustrating one example of drive signals Vdr1, Vdr2 in a "light load mode".

FIG. 3 is a diagram illustrating one example of the drive signals Vdr1, Vdr2 in the "normal mode". FIG. 4 is a diagram illustrating one example of the drive signals Vdr1, Vdr2 in the "light load mode".

The "normal mode" indicates, for example, a mode of continuously performing such a switching operation in which the drive signals Vdr1, Vdr2 alternatively go high, without intermittently stopping the switching operation, as illustrated in FIG. 3.

On the other hand, the "light load mode" indicates, for example, a mode of repeating a continuous switching operation, in which the drive signals Vdr1, Vdr2 alternatively go high as illustrated in FIG. 4, and a stop operation, in which the switching operation is intermittently stopped. Further, this "operation mode" is also referred to as a "burst mode".

In addition, while the switching power supply circuit 10 is operating in the "normal mode", the switching power supply circuit 10 is not operating in the "light load mode". Accordingly, the time when the switching power supply circuit 10 is operating in the "normal mode" is the time when it is not operating in the "light load mode".

Note that FIGS. 3 and 4 illustrate that the driver circuit 66 outputs the drive signals Vdr1, Vdr2 that are generated to have 50% duty cycle according to the oscillator signal Vosc and alternatively go high. However, in actual, the driver circuit 66 outputs the drive signals Vdr1, Vdr2 with dead time which are generated to have about 50% duty cycle according to the oscillator signal Vosc and alternatively go high. Note that FIG. 4 illustrates such that, in the switching operation, the number of pulses are the same between the drive signals Vdr1 and Vdr2, however, this is merely an example and the number of pulses may be different therebetween.

Here, the "dead time" indicates, for example, a time period from when the high drive signal Vdr1 goes low to when the drive signal Vdr2 goes high, and the time period during which both the drive signals Vdr1 and Vdr2 are low.

<<<<Details of Load Detection Circuit 63>>>>

Figure 5:
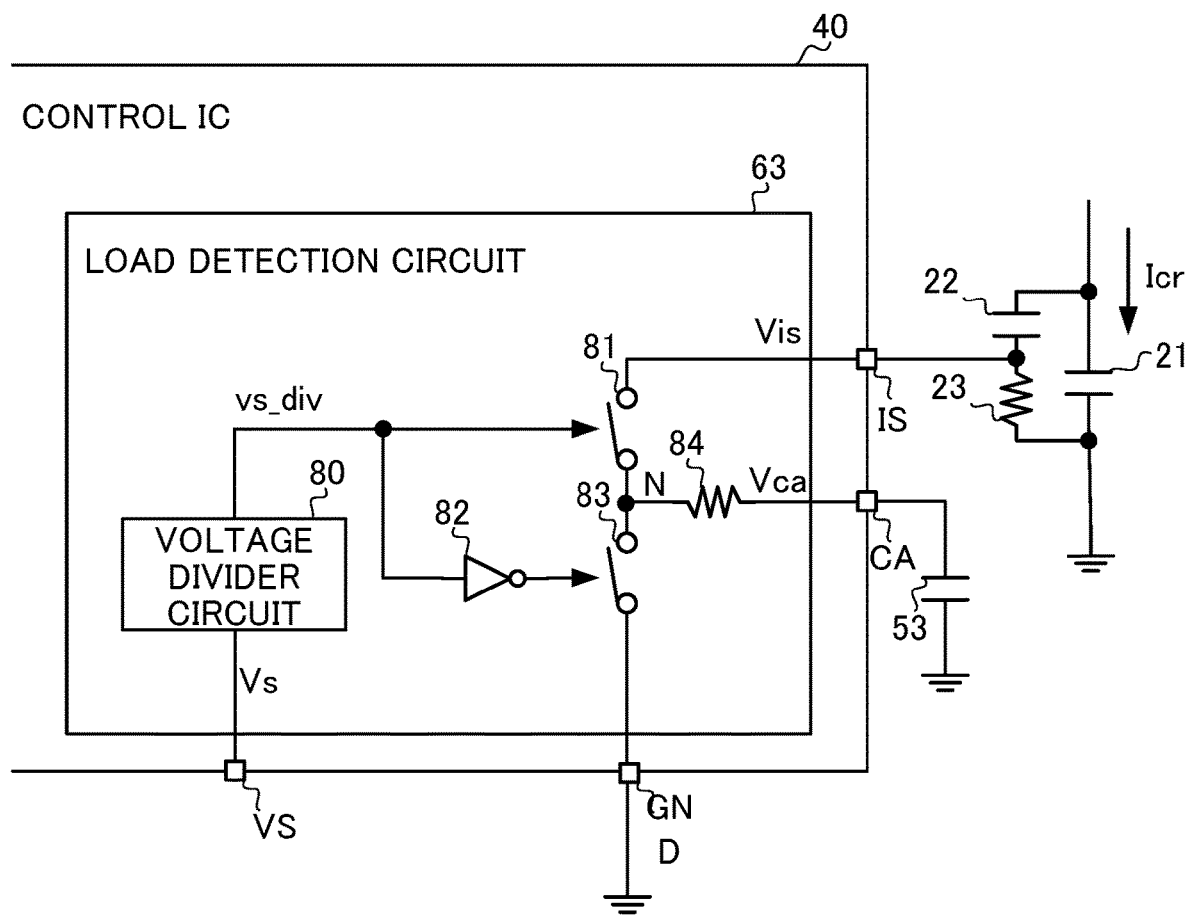
FIG. 5 is a diagram illustrating one example of a load detection circuit 63.

FIG. 5 is a diagram illustrating one example of the load detection circuit 63. The load detection circuit 63 averages a voltage Vis corresponding to the resonant current Icr based on a voltage Vs at the terminal VS, and outputs the voltage Vca corresponding to the power consumption PL of the load 11 and the "operation mode" of the switching power supply circuit 10.

Specifically, the load detection circuit 63 switches the voltage at a node N to the voltage Vis at the terminal IS or the ground voltage in response to a signal vs_div corresponding to the voltage Vs at the terminal VS. Then, the load detection circuit 63 charges or discharges the capacitor 53 coupled to the terminal CA via a resistor 84, and outputs the voltage Vca.

The load detection circuit 63 comprises a voltage divider circuit 80, switches 81, 83, an inverter 82, and the resistor 84.

The voltage divider circuit 80 divides the voltage Vs at the terminal VS, and outputs the resultant as the signal vs_div. The voltage Vs achieves the input voltage Vin upon turning on of the NMOS transistors 24, and achieves the ground voltage upon turning on of the NMOS transistor 25. As a result, the voltage divider circuit 80 outputs the high or low signal vs_div depending on the voltage Vs.

The switch 81 is an element that is turned on upon output of the high signal vs_div by the voltage divider circuit 80. Upon turning on of the switch 81, the voltage at the node N at which the switches 81 and 83 are coupled achieves the voltage Vis at the terminal IS.

The switch 83 is an element that is turned on upon output of a high signal by the inverter 82 in response to an output of the low signal vs_div from the voltage divider circuit 80. Upon turning on of the switch 83, the voltage at the node N achieves the ground voltage.

The resistor 84 is coupled between the node N and the terminal CA, and the resistor 84 configures, with the capacitor 53 coupled to the terminal CA, an RC integrator circuit that operates with a "time constant $\tau$". Here, the "time constant $\tau$" is expressed as "time constant $\tau$"=R1×C1 where R1 is the resistance value of the resistor 84, and C1 is the capacitance value of the capacitor 53. Note that the "time constant $\tau$" is sufficiently longer than the cycle of the drive signals Vdr1, Vdr2 for driving the NMOS transistors 24, 25.

Accordingly, the load detection circuit 63 charges the capacitor 53 via the resistor 84 with the voltage vis that is based on the positive resonant current Icr corresponding to the power consumption PL of the load 11, upon output of the high signal vs_div by the voltage divider circuit 80.

On the other hand, the load detection circuit 63 discharges the capacitor 53 via the resistor 84 with the ground voltage, upon output of the low signal vs_div by the voltage divider circuit 80.

Figure 6:
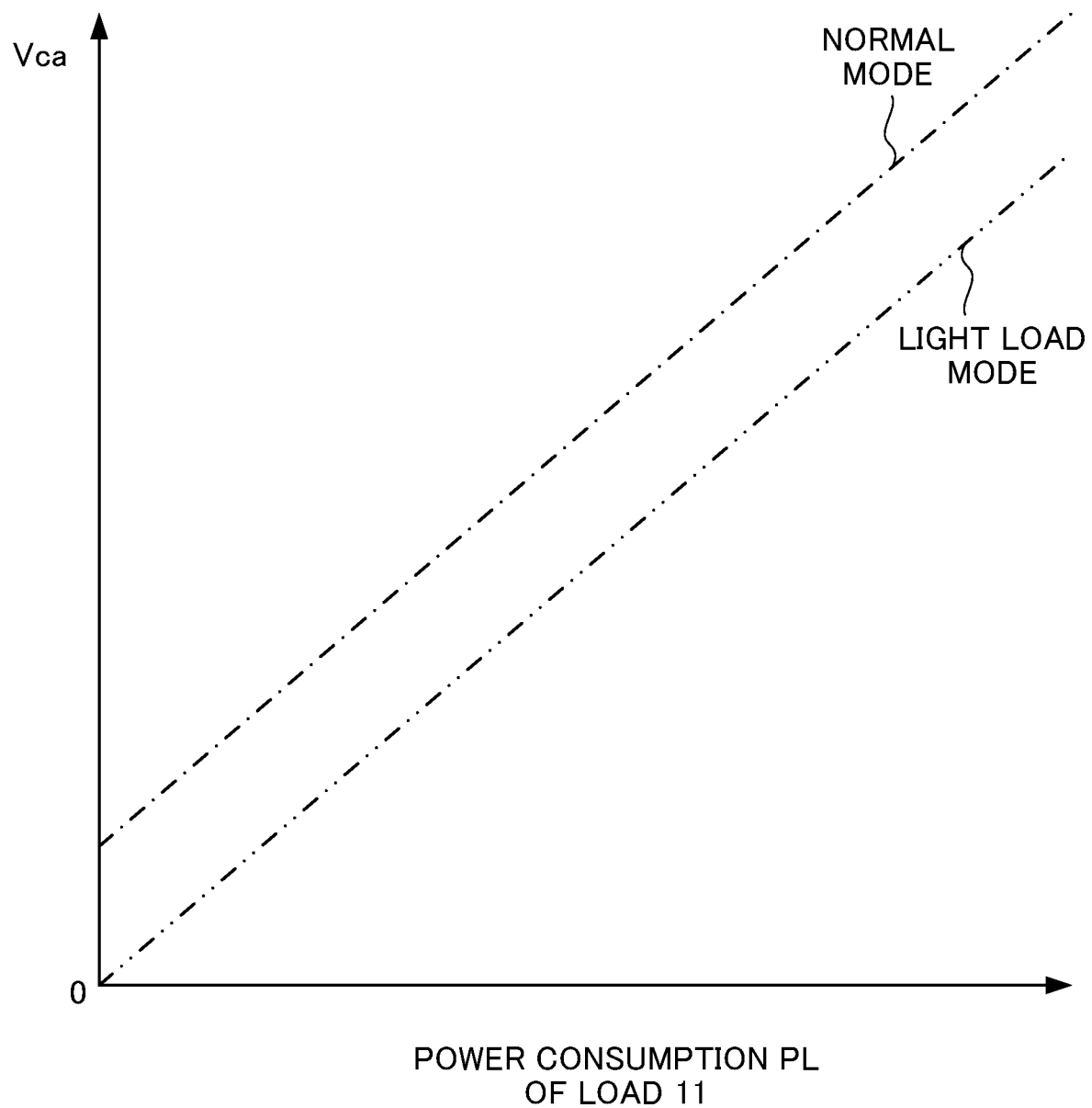
FIG. 6 is a diagram illustrating the relationship between a voltage Vca and a power consumption PL of a load 11 in a "normal mode" and a "light load mode".

Accordingly, the load detection circuit 63 averages the voltage Vis, thereby being able to output the voltage Vca according to the power consumption PL of the load 11. Note that, as illustrated in FIG. 6, the voltage Vca rises, as given by a dashed-dotted waveform corresponding to the "normal mode" or a dashed-two dotted waveform corresponding to the "light load mode", with an increase in the power consumption PL of the load 11.

The reason why two waveforms are formed depending on the "operation mode" as such is that the voltage Vca in the "normal mode" is higher than the voltage Vca in the "light load mode", for example, by an amount corresponding to the switching loss of the NMOS transistors 24, 25 that are driven in the "normal mode" and no-load loss of the transformer 26, in the case where the power consumption PL of the load 11 is the same therebetween.

Here, in an embodiment of the present disclosure, the "switching loss" refers to a loss determined by the rise time of the voltage Vs from the ground voltage to the input voltage Vin, the fall time thereof from the input voltage Vin to the ground voltage, the switching frequency of the NMOS transistors 24, 25. In other words, the "switching loss" is a loss that occurs every time the NMOS transistors 24, 25 are switched.

Further, in an embodiment of the present disclosure, the "no-load loss" refers to a loss caused by an alternating magnetic field generated in the iron core of the transformer 26 due to the excitation current in the resonant current Icr. Note that the average value of the resonant current Icr is greater when the switching power supply circuit 10 operates in the "normal mode", than that when the switching power supply circuit 10 operates in the "light load mode".

Note that the voltage Vca corresponds to a "detection voltage", the "normal mode" corresponds to a "first mode", and the "light load mode" corresponds to a "second mode". Further, the resistor 84 corresponds to a "resistor", and the capacitor 53 corresponds to a "capacitor".

<<<<Details of Control Circuit 65a>>>>

Figure 7:
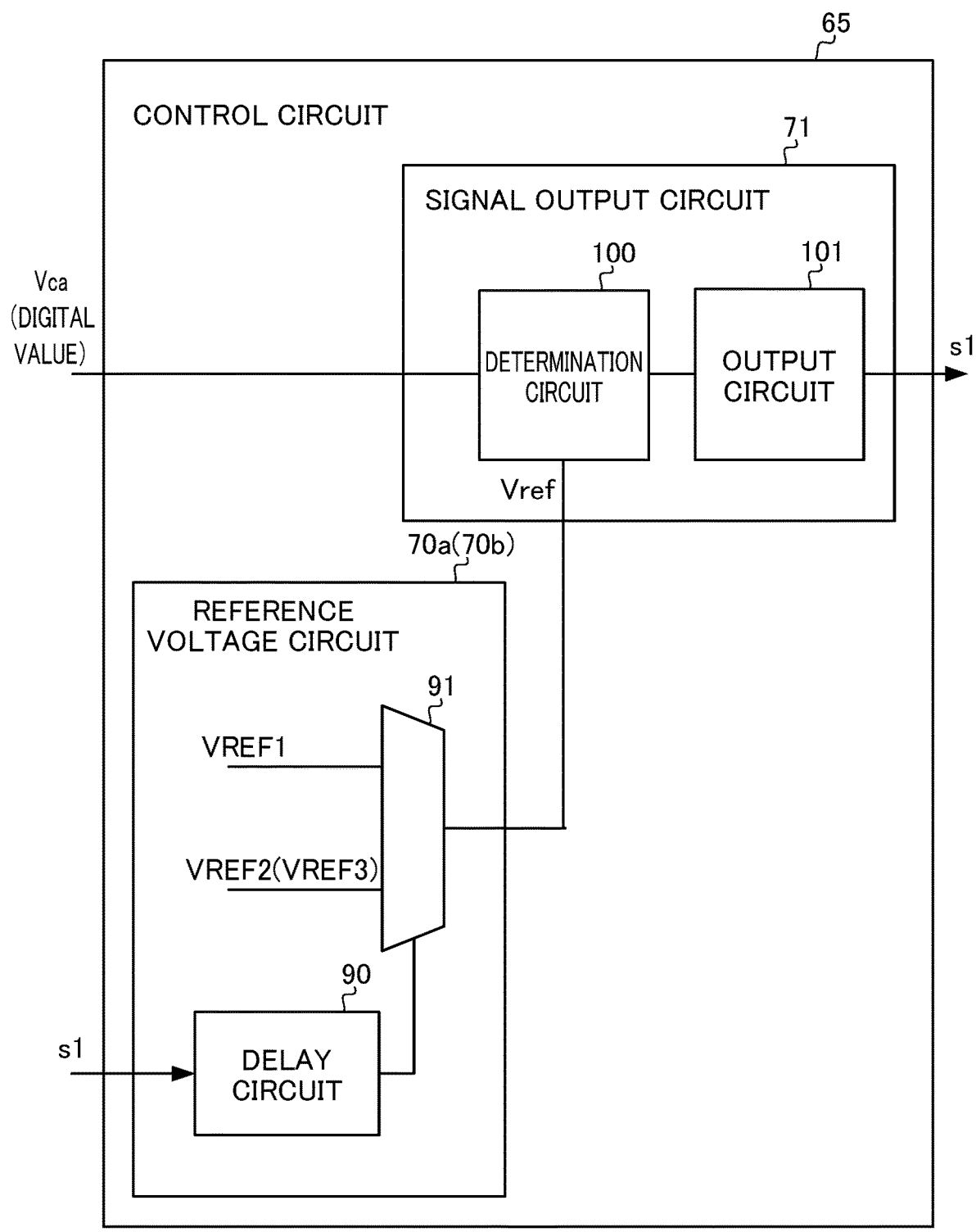
FIG. 7 is a diagram illustrating one example of control circuits 65a and 65b which is one embodiment of a control circuit 65.

FIG. 7 is a diagram illustrating one example of a control circuit 65a which is one embodiment of the control circuit 65. The control circuit 65a outputs the mode signal s1 indicating the "operation mode" of the switching power supply circuit 10 to the driver circuit 66 based on the voltage Vca.

Specifically, the control circuit 65a controls the driver circuit 66 such that the switching power supply circuit 10 operates in the "light load mode" upon the voltage Vca reaching a reference voltage Vref with a decrease in the power consumption PL of the load 11, when the switching power supply circuit 10 operates in the "normal mode".

On the other hand, the control circuit 65a controls the driver circuit 66 such that the switching power supply circuit 10 operates in the "normal mode" upon the voltage Vca reaching the reference voltage Vref with an increase in the power consumption PL of the load 11, when the switching power supply circuit 10 operates in the "light load mode". Further, the control circuit 65 comprises a reference voltage circuit 70a, and the signal output circuit 71.

<<<Details of Reference Voltage Circuit 70a>>>

The reference voltage circuit 70a outputs the reference voltage Vref for the signal output circuit 71 to determine the transition of the "operation mode", in response to the mode signal s1.

Specifically, the reference voltage circuit 70a outputs the reference voltage VREF1 indicating "power consumption P1", as the reference voltage Vref, based on the mode signal s1 indicating the "normal mode".

Meanwhile, the reference voltage circuit 70a outputs the reference voltage VREF2 indicating the "power consumption P1", as the reference voltage Vref, based on the mode signal s1 indicating the "light load mode". Note that the reference voltage VREF1 is higher than the reference voltage VREF2.

This makes it possible that the switching power supply circuit 10 operates in the "normal mode" when the power consumption PL of the load 11 is higher than the "power consumption P1", and operates in the "light load mode" when the power consumption PL of the load 11 is lower than the "power consumption P1". Further, the reference voltage circuit 70a comprises a delay circuit 90 and a selector 91.

The delay circuit 90 delays the mode signal s1 and outputs the resultant signal. Specifically, the delay circuit 90 causes the selector 91 to output the reference voltage Vref according to the "operation mode", after a "predetermined time period Ta" has elapsed since a change in the mode signal s1 indicating the "operation mode", such that the reference voltage Vref does not change immediately after the change in the mode signal s1 indicating the "operation mode". Note that the "predetermined time period Ta" is longer than the "time constant $\tau$".

This prevents the selector 91 from changing the reference voltage Vref during a time period during which the level of the voltage Vca, which is based on the resonant current Icr and corresponds to the voltage Vis varying with the "operation mode", changes due to the change in the "operation mode".

In other words, the level of the voltage Vca when the power consumption PL of the load 11 is predetermined power varies with the "operation mode". Thus, the "predetermined time period Ta" is longer than a time period until the change in the level of the voltage Vca caused by the change in the "operation mode" ends.

It is assumed that the delay circuit 90 delays the mode signals s1 indicating the "normal mode" and indicating the "light load mode", however, may delay only the mode signal s1 indicating the "normal mode" or the "light load mode".

The selector 91 outputs the reference voltage VREF1 or the reference voltage VREF2 as the reference voltage Vref based on the mode signal s1 delayed by the delay circuit 90.

Specifically, the selector 91 outputs the reference voltage VREF1 indicating the "power consumption P1" as the reference voltage Vref, based on the mode signal s1 indicating the "normal mode".

Meanwhile, the selector 91 outputs the reference voltage VREF2 indicating the "power consumption P1" as the reference voltage Vref, based on the mode signal s1 indicating the "light load mode".

<<<Details of Signal Output Circuit 71>>>

Figure 8:
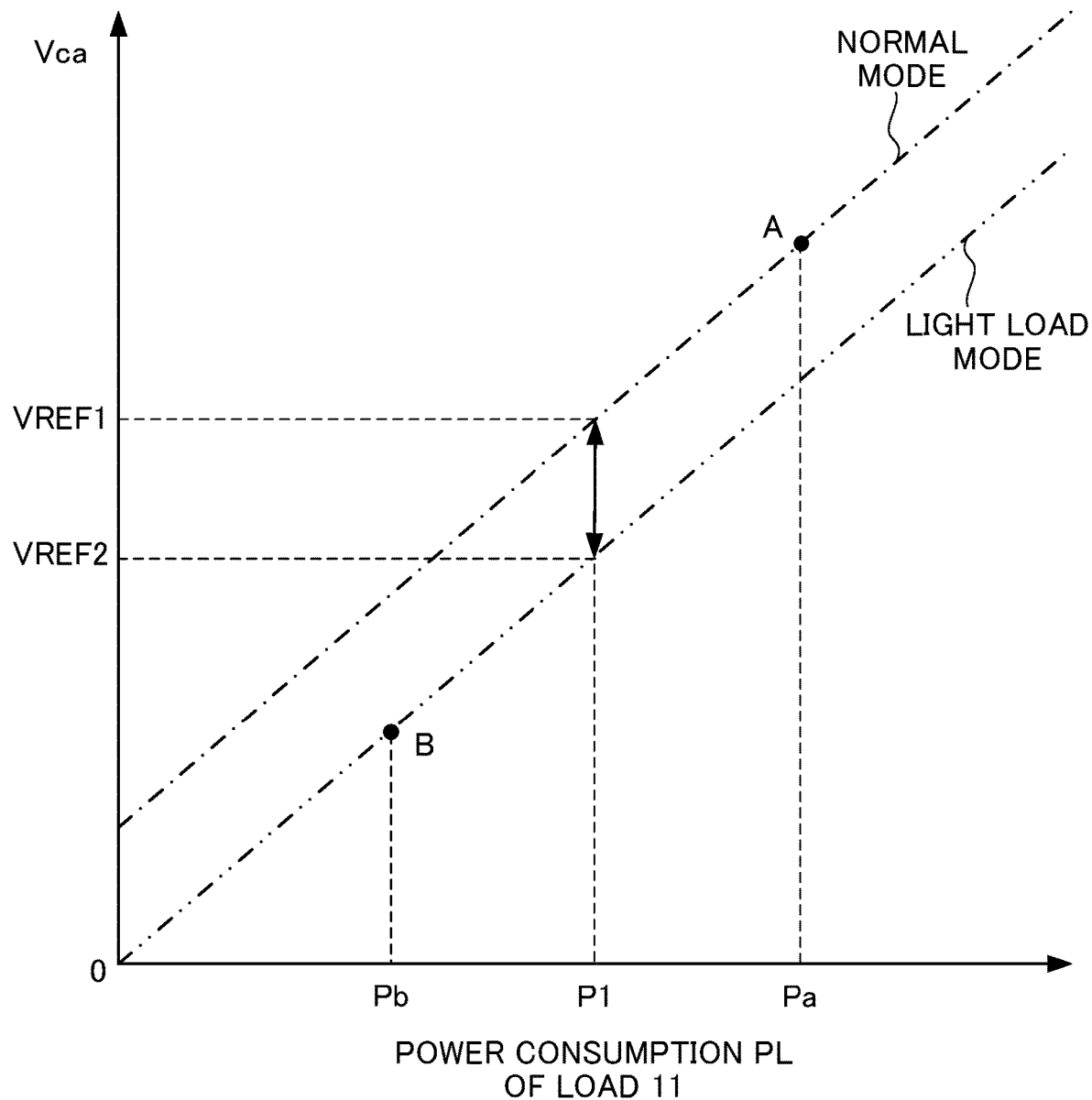
FIG. 8 is a diagram illustrating one example of the relationship between a voltage Vca and a power consumption PL of a load 11, in the case where an "operation mode" changes upon the power consumption PL reaching a "power consumption P1".

FIG. 8 is a diagram illustrating one example of the relationship between the voltage Vca and the power consumption PL of the load 11, in the case where the "operation mode" changes upon the power consumption PL reaching the "power consumption P1". In other words, FIG. 8 is an example of the operation of the control circuit 65a. The following will describe the signal output circuit 71 with reference to FIG. 8.

The signal output circuit 71 compares the reference voltage Vref outputted by the reference voltage circuit 70 and the voltage Vca, and outputs the mode signal s1 indicating the "operation mode" corresponding to the power consumption PL of the load 11.

Specifically, in the case of the transition from the "normal mode" to the "light load mode", the signal output circuit 71 outputs the mode signal s1 indicating the "light load mode", upon the voltage Vca reaching the reference voltage VREF1, which indicates the "power consumption P1", with a decrease in the power consumption of the load 11.

On the other hand, in the case of the transition from the "light load mode" to the "normal mode", the signal output circuit 71 outputs the mode signal s1 indicating the "normal mode", upon the voltage Vca reaching the reference voltage VREF2, which indicates the "power consumption P1", with an increase in the power consumption of the load 11. Further, the signal output circuit 71 comprises a determination circuit 100 and an output circuit 101.

When the power consumption PL of the load 11 is greater than the "power consumption P1", the control IC 40 drives the NMOS transistors 24, 25 in the "normal mode". On the other hand, the power consumption PL of the load 11 is smaller than the "power consumption P1", the control IC 40 drives the NMOS transistors 24, 25 in the "light load mode".

First, the following describes the operation of the signal output circuit 71 in the case of the transition from the "normal mode" to the "light load mode". When the power consumption PL of the load 11 is "power consumption Pa", the voltage Vca indicates the voltage at a point A. Then, when the power consumption PL of the load 11 decreases and the voltage Vca drops to the reference voltage VREF1 from the point A, the power consumption PL of the load 11 results in the "power consumption P1".

The determination circuit 100 compares the voltage Vca and the reference voltage VREF1 indicating the "power consumption P1", and determines whether a time period during which the power consumption PL of the load 11 is smaller than the "power consumption P1" continues for a "predetermined time period Tb".

Specifically, the determination circuit 100 determines whether the time period during which the power consumption PL of the load 11 is smaller than the "power consumption P1" continues for the "predetermined time period Tb", based on the voltage Vca, in order to avoid the "operation mode" from changing due to a momentary drop in the voltage Vca caused by the decrease in the power consumption PL of the load 11.

Accordingly, the determination circuit 100 causes the output circuit 101 not to change the mode signal s1, in the case where the voltage Vca rises above the reference voltage VREF1 with an increase in the power consumption PL of the load 11 immediately after the voltage Vca drops below the reference voltage VREF1 with a decrease in the power consumption PL of the load 11.

The output circuit 101 outputs the mode signal s1 indicating each mode of the "operation mode" based on the result of the determination of the determination circuit 100, such that the control IC 40 can drive the NMOS transistors 24, 25 in the appropriate "operation mode" according to an increase or decrease in the power consumption PL of the load 11.

Specifically, the output circuit 101 outputs the mode signal s1 indicating the "light load mode", upon determination of the determination circuit 100 that the time period during which the power consumption PL of the load 11 is smaller than the "power consumption P1" continues for the "predetermined time period Tb".

As illustrated in FIG. 8, when the voltage Vca drops to the reference voltage VREF1 from the point A with a decrease in the power consumption PL of the load 11, the determination circuit 100 and the output circuit 101 operate as described above. Accordingly, the signal output circuit 71 outputs the mode signal s1 indicating the "light load mode". Then, the switching power supply circuit 10 operates in the "light load mode".

Next, the following describes the operation of the signal output circuit 71 in the case of the transition from the "light load mode" to the "normal mode". As illustrated in FIG. 8, when the power consumption PL of the load 11 is "power consumption Pb", the voltage Vca indicates the voltage at a point B. Then, when the voltage Vca rises to the reference voltage VREF2 from the point B with an increase in the power consumption PL of the load 11, the power consumption PL of the load 11 results in the "power consumption P1".

At this time, the determination circuit 100 does not determine whether the time period during which the power consumption PL of the load 11 is smaller than the "power consumption P1" continues for the "predetermined time period Tb", based on the voltage Vca.

Then, the output circuit 101 outputs the mode signal s1 indicating the "normal mode", upon the voltage Vca reaching the reference voltage VREF2 indicating the "power consumption P1" with an increase in the power consumption PL of the load 11. In other words, in the case of the transition from the "light load mode" to the "normal mode", the output circuit 101 outputs the mode signal s1 indicating the "normal mode", before the time period during which the power consumption PL of the load 11 is smaller than the "power consumption P1" continues for the "predetermined time period Tb".

When the voltage Vca rises to the reference voltage VREF2 from the point B with an increase in the power consumption PL of the load 11, the determination circuit 100 and the output circuit 101 operate as described above. Accordingly, the signal output circuit 71 outputs the mode signal s1 indicating the "normal mode". Then, the switching power supply circuit 10 operates in the "normal mode".

As such, the reference voltage circuit 70a outputs the reference voltage VREF1 in the "normal mode", and outputs the reference voltage VREF2 in the "light load mode".

Accordingly, the transition between the "normal mode" and the "light load mode" is performed upon the power consumption PL of the load 11 reaching the "power consumption P1".

In addition, determining the transition between the "normal mode" and the "light load mode" using one single reference voltage causes the power consumption when transitioning to the modes of the "operation mode" to vary with the "operation mode". In this case, even if the power consumption PL of the load 11 increases greater than the "power consumption P1", the switching power supply circuit 10 operates in the "light load mode". This results in poor responsiveness when transitioning from the "light load mode" to the "normal mode", and the output voltage Vout may drop.

In contrast, the use of two reference voltages VREF1, VREF2 that correspond to the "power consumption P1" improves the responsiveness when transitioning from the "light load mode" to the "normal mode", thereby being able to reduce a drop in the output voltage Vout caused by an increase in the power consumption PL of the load 11.

Note that the level of the reference voltage VREF1 corresponds to a "first level", the level of the reference voltage VREF2 corresponds to a "second level", the mode signal s1 indicating the "normal mode" corresponds to a "first signal", and the mode signal s1 indicating the "light load mode" corresponds to a "second signal".

In addition, the "predetermined time period Ta" corresponds to a "first time period", the "predetermined time period Tb" corresponds to a "second time period", the mode signal s1 corresponds to an "output signal", and the "power consumption P1" corresponds to a "first value".

<<<<Operation of Control IC 40 in the Case Where "Operation Mode" Changes Upon Power Consumption PL Reaching "Power Consumption P1">>>>

Figure 9:
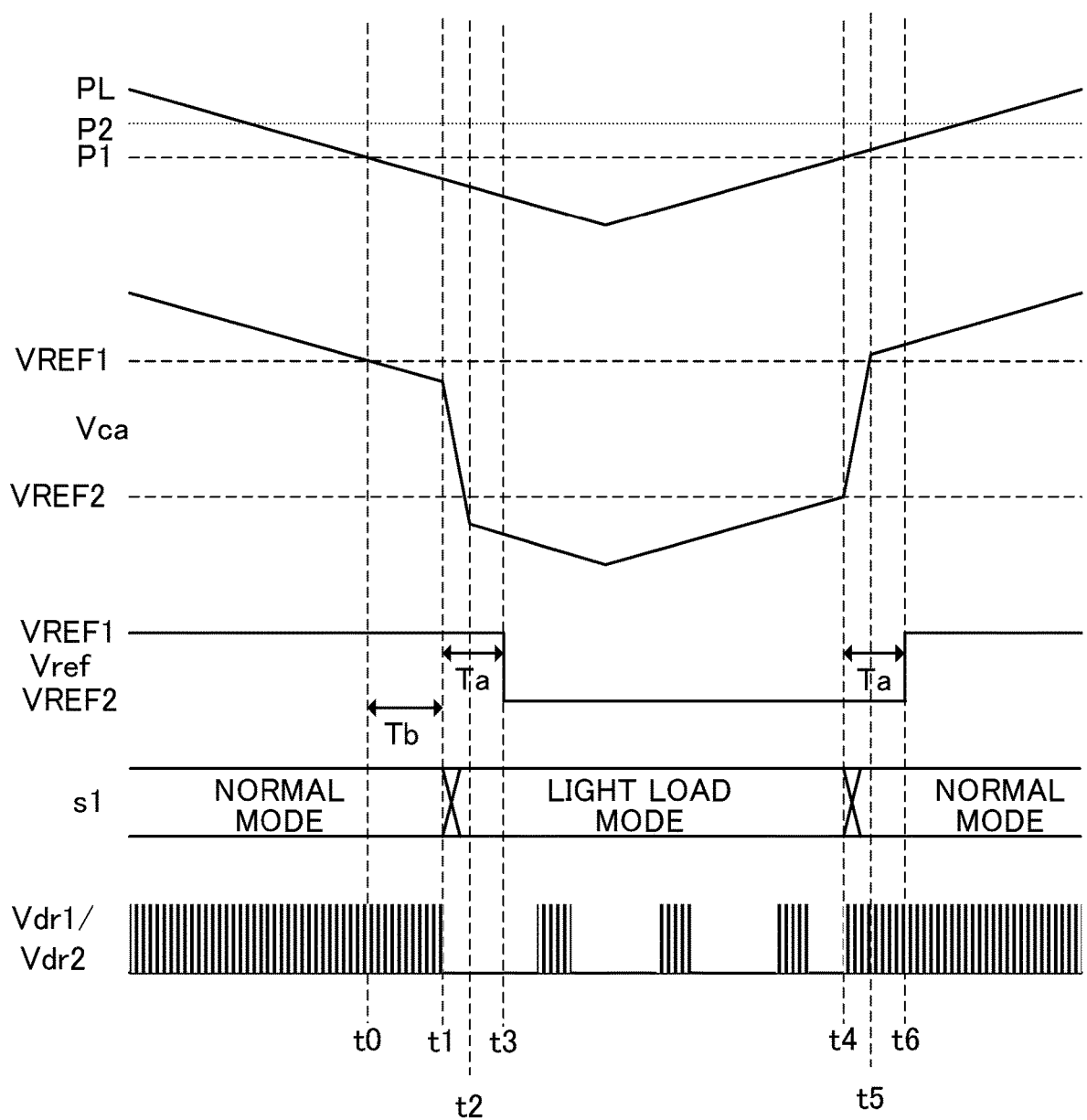
FIG. 9 is a diagram explaining one example of an operation of a control IC 40 in the case where a switching power supply circuit 10 operates as illustrated in FIG. 8.

FIG. 9 is a diagram explaining one example of an operation of the control IC 40 in the case where the switching power supply circuit 10 operates as illustrated in FIG. 8. It is assumed that, before time t0, the switching power supply circuit 10 operates in the "normal mode" and the power consumption PL of the load 11 decreases. In this time, the relationship between the power consumption PL of the load 11 and the voltage Vca is given by the dashed-dotted waveform in FIG. 8.

At time t0, the reference voltage circuit 70a outputs the reference voltage VREF1 as the reference voltage Vref. When the power consumption PL of the load 11 decreases to the "power consumption P1", the load detection circuit 63 outputs the voltage Vca resulting in the reference voltage VREF1. At this time, the determination circuit 100 determines whether the voltage Vca is smaller than the reference voltage VREF1 for the "predetermined time period Tb".

At time t1 at which the "predetermined time period Tb" has elapsed since time t0, the output circuit 101 outputs the mode signal s1 indicating the "light load mode" when the determination circuit 100 determines that the voltage Vca is smaller than the reference voltage VREF1 for the "predetermined time period Tb". Upon output of the mode signal s1 indicating the "light load mode" by the output circuit 101, the control IC 40 starts driving the NMOS transistors 24, 25 intermittently. Accordingly, the load detection circuit 63 outputs the further dropped voltage Vca because the average value of the resonant current Icr decreases even without a significant decrease in the power consumption PL of the load 11.

The drop in the voltage Vca caused by the change in the "operation mode" ends at time t2. At this time, the relationship between the power consumption PL of the load 11 and the voltage Vca is given by the dashed-two dotted waveform in FIG. 8.

At time t3 at which the "predetermined time period Ta" has elapsed since time t1, the delay circuit 90 outputs the mode signal s1 indicating the "light load mode" outputted by the output circuit 101 at time t1. Accordingly, the selector 91 selects the reference voltage VREF2 and outputs it as the reference voltage Vref.

When the power consumption PL of the load 11 increases to the "power consumption P1" at time t4, the load detection circuit 63 outputs the voltage Vca resulting in the reference voltage VREF2. At this time, the determination circuit 100 does not determine whether the voltage Vca is smaller than the reference voltage VREF2 for the "predetermined time period Tb".

Then, the output circuit 101 outputs the mode signal s1 indicating the "normal mode". Upon output of the mode signal s1 indicating the "normal mode" by the output circuit 101, the control IC 40 starts driving the NMOS transistors 24, 25 continuously. Accordingly, the load detection circuit 63 outputs the further risen voltage Vca because the average value of the resonant current Icr increases even without a significant increase in the power consumption PL of the load 11.

The rise in the voltage Vca caused by the change in the "operation mode" ends at time t5. At this time, the relationship between the power consumption PL of the load 11 and the voltage Vca is given by the dashed-dotted waveform in FIG. 8.

At time t6 at which the "predetermined time period Ta" has elapsed since time t4, the delay circuit 90 outputs the mode signal s1 indicating the "normal mode" outputted by the output circuit 101 at time t4. Accordingly, the selector 91 selects the reference voltage VREF1 and outputs it as the reference voltage Vref.

<<<<Details of Control Circuit 65b>>>>

Returning to FIG. 7, FIG. 7 is a diagram illustrating one example of a control circuit 65b according to one embodiment of the control circuit 65. The configuration of the control circuit 65b is similar to that of the control circuit 65a except that a reference voltage circuit 70b is used as the reference voltage circuit 70, and thus a description thereof is omitted. Further, the control circuit 65b comprises the reference voltage circuit 70b and the signal output circuit 71.

<<<Details of Reference Voltage Circuit 70b>>>

The reference voltage circuit 70b is similar to the reference voltage circuit 70a except that the reference voltage VREF3 indicating a "power consumption P2" is outputted as the reference voltage Vref instead of the reference voltage VREF2 in response to the mode signal s1 indicating the "light load mode". Note that the "power consumption P2" is greater than the "power consumption P1", and the reference voltage VREF1 is higher than the reference voltage VREF3.

This results in that the "operation mode" transitions from the "light load mode" to the "normal mode" upon the power consumption PL of the load 11 reaching the "power consumption P2", which is greater than the "power consumption P1". However, such an operation can reduce a drop in the output voltage Vout caused by an increase in the power consumption PL of the load 11, in consideration of minute change in the voltage Vca caused by transient change in the power consumption PL of the load 11.

The signal output circuit 71 is similar between the control circuit 65a and the control circuit 65b, and thus a description thereof is omitted.

Figure 10:
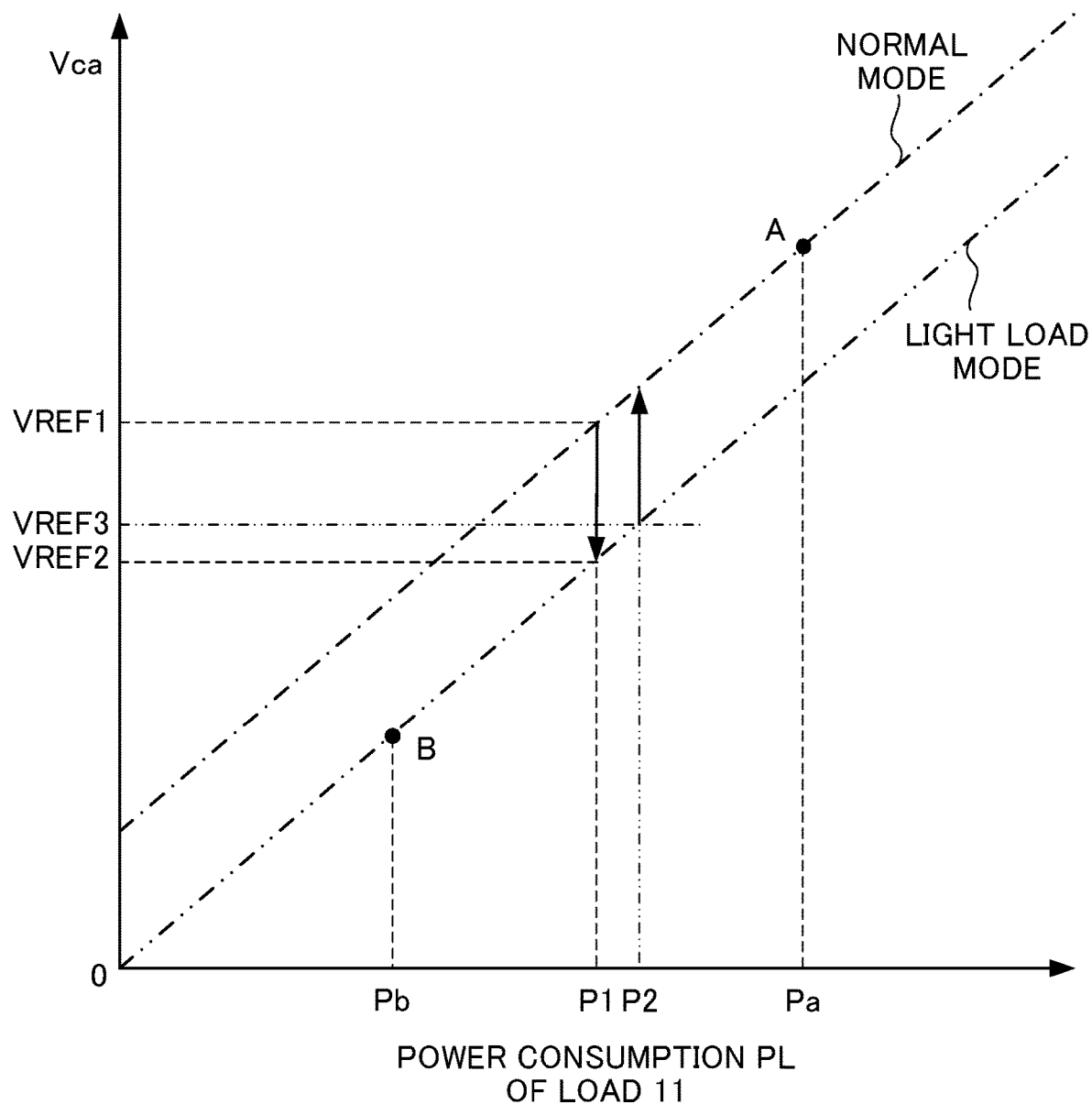
FIG. 10 is a diagram illustrating one example of the relationship between a voltage Vca and a power consumption PL of a load 11, in the case where an "operation mode" changes upon the power consumption PL reaching a "power consumption P1" and a "power consumption P2".

FIG. 10 is a diagram illustrating one example of the relationship between the voltage Vca and the power consumption PL of the load, in the case where the "operation mode" changes upon the power consumption PL 11 reaching the "power consumption P1" and the "power consumption P2". In other words, FIG. 10 is one example of the case where the control circuit 65b is used as the control circuit 65.

The control IC 40 drives the NMOS transistors 24, 25 in the "normal mode" when the power consumption PL of the load 11 is greater than the "power consumption P2". Further, the control IC 40 drives the NMOS transistors 24, 25 in the "normal mode" until the power consumption PL of the load 11 decreases to the "power consumption P1".

On the other hand, the control IC 40 drives the NMOS transistors 24, 25 in the "light load mode" when the power consumption PL of the load 11 is smaller than the "power consumption P1". Further, the control IC 40 rives the NMOS transistors 24, 25 in the "light load mode" until the power consumption PL of the load 11 increases to the "power consumption P2".

The operation in the case of the transition from the "normal mode" to the "light load mode" is similar to the operation in FIG. 8. Thus, the following will describe the operation in the case of the transition from the "light load mode" to the "normal mode".

When the power consumption PL of the load 11 is "power consumption Pb", the voltage Vca indicates the voltage at the point B. Then, when the voltage Vca rises to the reference voltage VREF3 with an increase in the power consumption PL of the load 11, the power consumption PL of the load 11 results in the "power consumption P2". At this time, the signal output circuit 71 outputs the mode signal s1 indicating the "normal mode". Then, the switching power supply circuit 10 operates in the "normal mode".

As such, the reference voltage circuit 70b outputs the reference voltage VREF1 in the "normal mode", and outputs the reference voltage VREF3 in the "light load mode". Accordingly, the transition from the "normal mode" to the "light load mode" is performed upon the power consumption PL of the load 11 reaching the "power consumption P1". On the other hand, the transition from the "light load mode" to the "normal mode" is performed upon the power consumption PL of the load 11 reaching the "power consumption P2".

If one single reference voltage is used to determine the "operation mode", the transition of the "operation mode" occurs at the different power consumptions PL of the load 11. That is, after the power consumption PL of the load 11 further increases, the transition from the "light load mode" to the "normal mode occurs.

In contrast, in an embodiment of the present disclosure, when the transition of the "operation mode" upon the power consumption PL of the load 11 reaching the "power consumption P1" is intended originally, the transition of the "operation mode" is determined using the reference voltage VREF1 corresponding to the "power consumption P1" or the reference voltage VREF3 corresponding to the "power consumption P2".

By determining the transition of the "operation mode" as such, it is possible to reduce a drop in the output voltage Vout caused by an increase in the power consumption PL of the load 11, in consideration of minute change in the voltage Vca caused by transient change in the power consumption PL of the load 11. Note that the level of the reference voltage VREF3 corresponds to a "second level", and the "power consumption P2" corresponds to a "second value".

<<<<Operation of Control IC 40 in the Case Where "Operation Mode" Changes Upon Power Consumption PL Reaching "Power Consumption P1" or "Power Consumption P2">>>>

Figure 11:
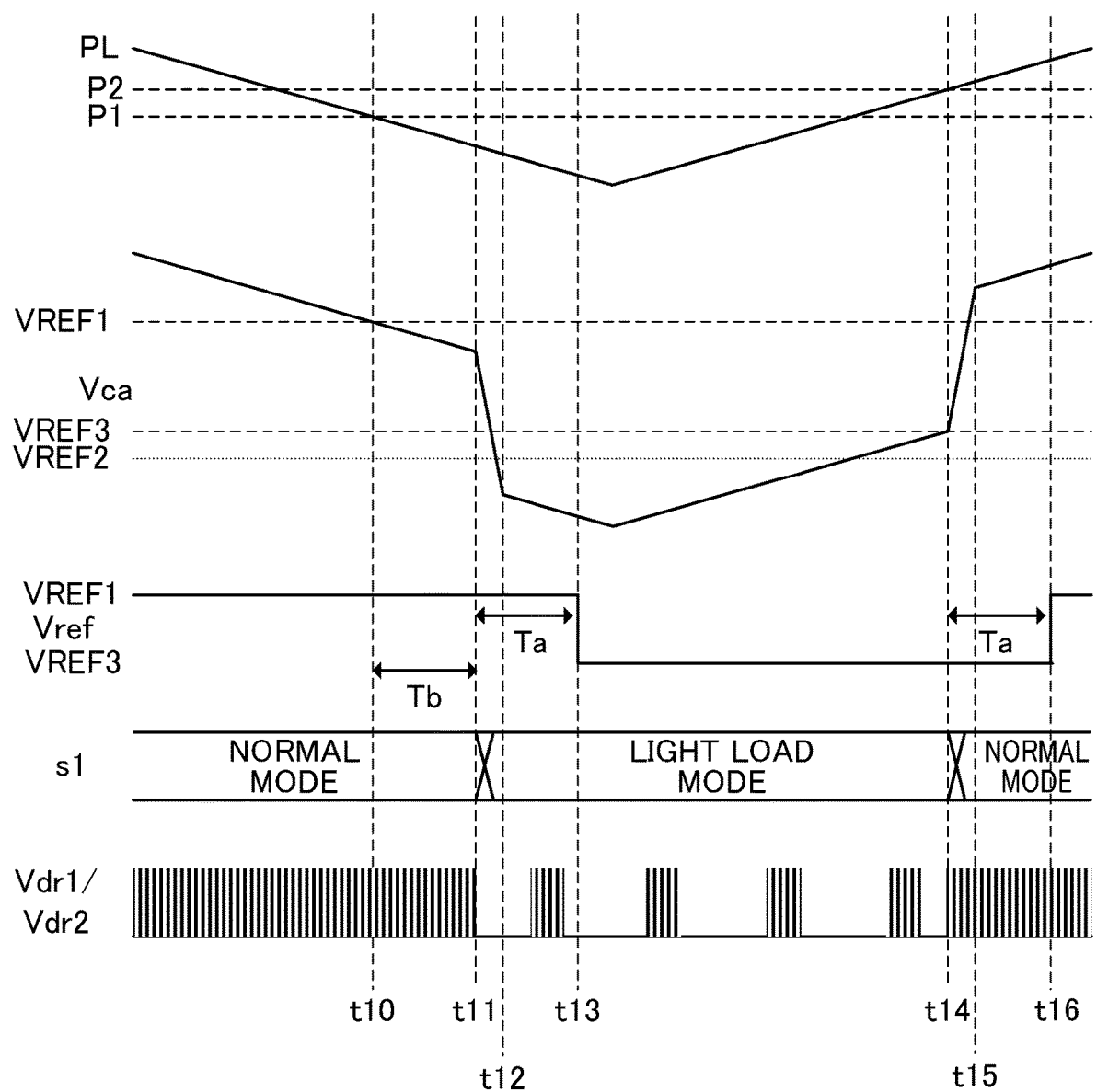
FIG. 11 is a diagram illustrating one example of an operation of a control IC 40, in the case where a switching power supply circuit 10 operates as illustrated in FIG. 10.

FIG. 11 is a diagram illustrating one example of the operation of the control IC 40, in the case where the switching power supply circuit 10 operates as illustrated in FIG. 10. It is assumed that, before time t10, the switching power supply circuit 10 operates in the "normal mode" and the power consumption PL of the load 11 decreases. In this time, the relationship between the power consumption PL of the load 11 and the voltage Vca is given by the dashed-dotted waveform in FIG. 9.

The operation from time t10 to time t12 is similar to the operation from time t0 to time t2 in FIG. 9, and thus a description thereof is omitted.

At time t13 at which the "predetermined time period Ta" has elapsed since time t11, the delay circuit 90 outputs the mode signal s1 indicating the "light load mode" outputted by the output circuit 101 at time t11. Accordingly, the selector 91 selects the reference voltage VREF3, and outputs it as the reference voltage Vref.

At time t14, when the power consumption PL of the load 11 increases to the "power consumption P2", the load detection circuit 63 outputs the voltage Vca resulting in the reference voltage VREF3. At this time, the determination circuit 100 does not determine whether the voltage Vca is smaller than the reference voltage VREF3 for the "predetermined time period Tb".

Then, the output circuit 101 outputs the mode signal s1 indicating the "normal mode". Upon output of the mode signal s1 indicating the "normal mode" by the output circuit 101, the control IC 40 starts driving the NMOS transistors 24, 25 continuously. Accordingly, the load detection circuit 63 outputs the further risen voltage Vca because the average value of the resonant current Icr increases even without a significant increase in the power consumption PL of the load 11.

Further, the operation from time t15 to time t16 is similar to the operation from time t5 to time t6 in FIG. 9, and thus a description thereof is omitted.

===Modified Example===

Figure 12:
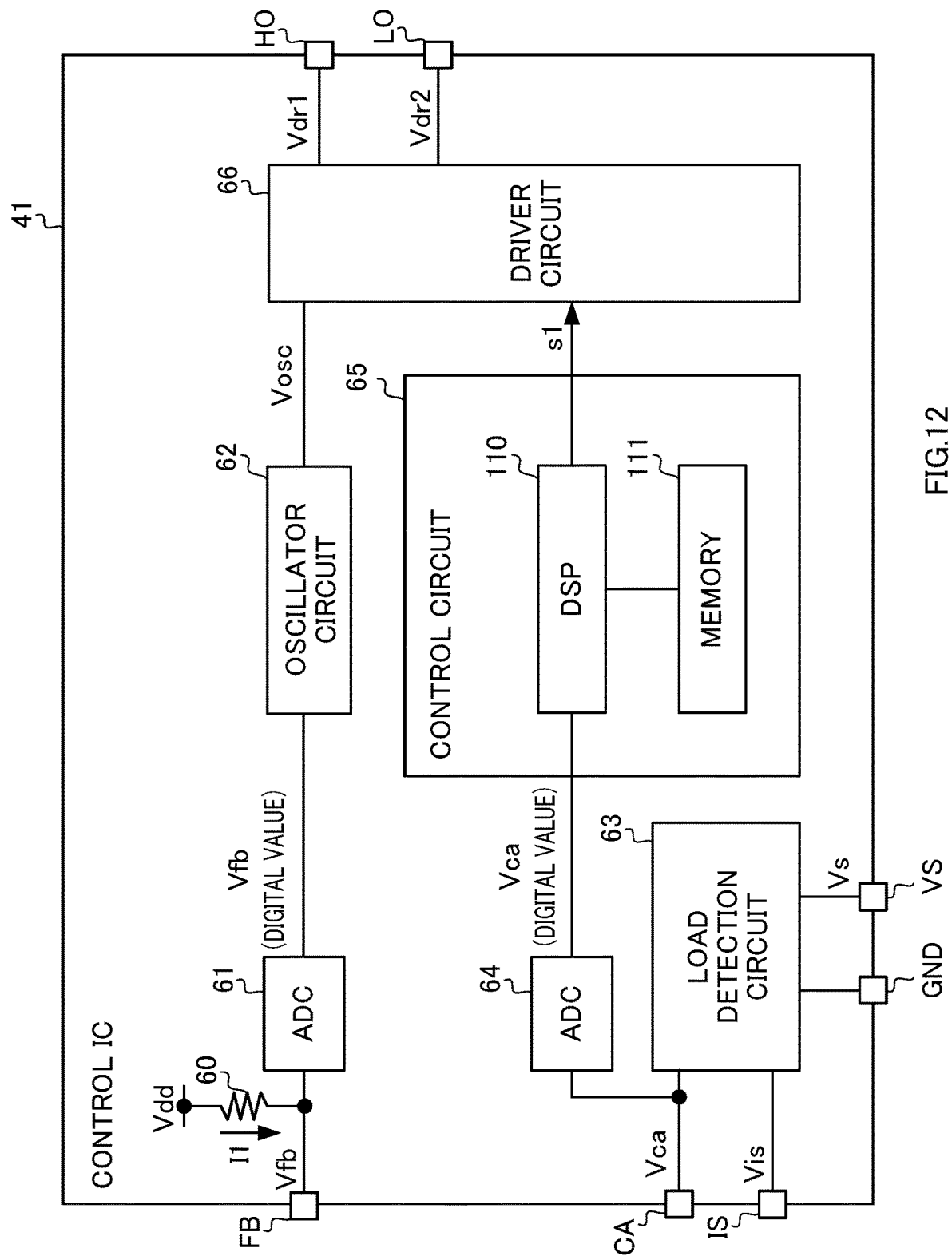
FIG. 12 is a diagram illustrating one example of a control IC 41, in the case where a control circuit 65 is implemented with a DSP 110 and a memory 111.

FIG. 12 is a diagram illustrating one example of a control IC 41, in the case where the control circuit 65 is implemented with a digital signal processor (DSP) 110 and a memory 111. In FIG. 12, elements and the like that are similar to those illustrated in FIG. 2 are given the same reference numerals as in FIG. 2.

The control circuit 65 comprise the DSP 110 and the memory 111. The memory 111 stores a reference voltage unit corresponding to the process of the reference voltage circuit 70 and a signal output unit corresponding to the process of the signal output circuit 71. Then, the DSP 110 executes the processes of the reference voltage unit and the signal output unit read from the memory 111.

In an embodiment of the present disclosure, an example in which the control IC 40 is used in an LLC current resonant converter has been described. However, the control IC 40 can be used in a power supply circuit (e.g., a flyback converter, synchronous rectifier converter, etc.) that generate an output voltage through driving a transistor for controlling an inductor current flowing through an inductor.

===Summary===

Hereinabove, the switching power supply circuit 10 according to an embodiment of the present disclosure has been described. The control IC 40 controls the driver circuit 66, such that the switching power supply circuit 10 operates in the "light load mode" upon the voltage Vca outputted by the load detection circuit 63 reaching the reference voltage VREF1 with a decrease in the power consumption PL of the load 11, when the switching power supply circuit 10 operates in the "normal mode". On the other hand, the control IC 40 controls the driver circuit 66, such that the switching power supply circuit 10 operates in the "normal mode" upon the voltage Vca reaching the reference voltage VREF2 or VREF3 with an increase in the power consumption PL of the load 11, when the switching power supply circuit 10 operates in the "light load mode". This makes it possible to change the "operation mode", when the power consumption PL of the load 11 reaches the "power consumption P1", or the power consumption PL reaches the "power consumption P1" or the "power consumption P2", even if the relationship between the power consumption PL of the load 11 and the voltage Vca are represented by waveforms varying with the "operation mode". Accordingly, it is possible to provide an integrated circuit capable of appropriately operating a power supply circuit according to a plurality of modes.

Further, the control circuit 65 comprises the reference voltage circuit 70 and the signal output circuit 71. This makes it possible to compare the voltage Vca with each of the reference voltages Vref used when the "operation mode" is changed in corresponding one of the waveforms, even if the relationship between the power consumption PL of the load 11 and the voltage Vca are represented by waveforms varying with the "operation mode".

Further, the reference voltage circuit 70 maintains the reference voltage Vref until the "predetermined time period Ta" has elapsed since receipt of the mode signal s1 indicating the "normal mode". In other words, the reference voltage circuit 70 does not change the reference voltage Vref while the voltage Vca changes from a waveform in the "light load mode" to a waveform in the "normal mode" in waveforms in which the relationship between the power consumption PL of the load 11 and the voltage Vca varies with the "operation mode". This makes it possible that the output circuit 101 maintains the mode signal s1 indicating the "light load mode" until the change in the voltage Vca ends.

Further, the reference voltage circuit 70 maintains the reference voltage Vref until the "predetermined time period Ta" has elapsed since receipt of the mode signal s1 indicating the "light load mode". In other words, the reference voltage circuit 70 does not change the reference voltage Vref while the voltage Vca changes from the waveform in the "normal mode" to the waveform in the "light load mode" in waveforms in which the relationship between the power consumption PL of the load 11 and the voltage Vca varies with the "operation mode". This makes it possible that the output circuit 101 maintains the mode signal s1 indicating the "normal mode" until the change in the voltage Vca ends.

Further, the reference voltage circuit 70 maintains the reference voltage Vref until the "predetermined time period Ta" has elapsed since receipt of the mode signal s1. In other words, the reference voltage circuit 70 does not change the reference voltage Vref while the voltage Vca changes between waveforms in which the relationship between the power consumption PL of the load 11 and the voltage Vca varies with the "operation mode". This makes it possible that the output circuit 101 maintains the mode signal s1 until the change in the voltage Vca caused by change in the "operation mode" ends.

Further, the "predetermined time period Ta" is longer than the "time constant $\tau$" of the RC integrator circuit configured with the resistor 84 of the load detection circuit 63 and the capacitor 53 coupled to the terminal CA. This makes it possible that the load detection circuit 63 outputs the voltage Vca according to the "operation mode".

Further, the signal output circuit 71 comprises the determination circuit 100 and the output circuit 101. The determination circuit 100 does not cause the output circuit 101 to change the mode signal s1 in the case where the voltage Vca exceeds the reference voltage VREF1 immediately after the voltage Vca drops below the reference voltage VREF1. In the case where the voltage Vca exceeds the reference voltage VREF2 or VREF3 in the "light load mode", the output circuit 101 immediately changes the mode signal s1 from the "light load mode" to the "normal mode" before a time period during which the power consumption PL of the load 11 is smaller than the "power consumption P1" or the "power consumption P2" continues for the "predetermined time period Tb". In other words, the signal output circuit 71 changes the "operation mode" from the "normal mode" to the "light load mode", upon confirming that the power consumption PL of the load 11 is stably lower than the "power consumption P1", and immediately changes the "operation mode" from the "light load mode" to the "normal mode" upon the power consumption PL of the load 11 exceeding the "power consumption P1" or the "power consumption P2". This makes it possible that the switching power supply circuit 10 generates the output voltage Vout with more excellent efficiency and responsiveness.

Further, the reference voltage circuit 70 changes the "operation mode" from the "light load mode" to the "normal mode", in the case where the power consumption PL of the load 11 reaches the "power consumption P2" different from the "power consumption P1". This makes it possible to reduce a drop in the output voltage Vout caused by an increase in the power consumption PL of the load 11, in consideration of minute change in the voltage Vca, although the "operation mode" transitions from the "light load mode" to the "normal mode" upon the power consumption PL of the load 11 reaching the "power consumption P2", which is greater than the "power consumption P1".

Further, the reference voltage VREF1 is set higher than the reference voltages VREF2 and VREF3. This makes it possible to improve responsiveness to the load 11 and efficiency of the switching power supply circuit 10 more as compared with the case where the "operation mode" is changed using the same voltage Vca.

Further, the reference voltage VREF1 in the "normal mode" and the reference voltage VREF2 in the "light load mode" are set to voltages of the voltage Vca when the power consumption PL of the load 11 reaches the "power consumption P1". This makes it possible that the switching power supply circuit 10 operates in the "normal mode" when the power consumption PL of the load 11 is higher than the "power consumption P1", and operates in the "light load mode" when the power consumption PL of the load 11 is lower than the "power consumption P1".

Further, the "operation mode" of the switching power supply circuit 10 includes two modes of the "normal mode" and the "light load mode", and the control IC 40 changes a method of driving the NMOS transistors 24, 25 according to each of the modes of the "operation mode". This makes it possible that the switching power supply circuit 10 generates the output voltage Vout efficiently while reducing a drop in the output voltage Vout, even if the power consumption PL of the load 11 changes.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

According to the present disclosure, it is possible to provide an integrated circuit capable of appropriately operating a power supply circuit according to a plurality of modes.

What is claimed is:

1. An integrated circuit for a power supply circuit configured to generate an output voltage at a target level from an input voltage inputted thereto, the power supply circuit including
an inductor, and
a transistor configured to control an inductor current flowing through the inductor,
the integrated circuit being configured to control and switch the transistor,
the power supply circuit being configured to operate in an operation mode that is a first mode or a second mode, the integrated circuit comprising:
a load detection circuit configured to output a detection voltage corresponding to a power consumption of a load of the power supply circuit and corresponding to the operation mode of the power supply circuit, based on the inductor current;
a driver circuit configured to drive the transistor according to the operation mode of the power supply circuit; and
a control circuit configured to so control the driver circuit that
the power supply circuit operates in the second mode upon the detection voltage reaching a first level with a decrease in the power consumption of the load, when the power supply circuit operates in the first mode, and
the power supply circuit operates in the first mode upon the detection voltage reaching a second level with an increase in the power consumption of the load, when the power supply circuit operates in the second mode, wherein
the control circuit includes
a reference voltage circuit configured to output a reference voltage that is
at the first level in response to a first signal for operating the power supply circuit in the first mode, and
at the second level in response to a second signal for operating the power supply circuit in the second mode, and
a signal output circuit configured to
output the second signal upon the detection voltage reaching the first level with the decrease in the power consumption of the load, and
output the first signal upon the detection voltage reaching the second level with the increase in the power consumption of the load.

2. The integrated circuit according to claim 1, wherein the reference voltage circuit outputs the reference voltage at the first level when a first time period has elapsed since receipt of the first signal.

3. The integrated circuit according to claim 2, further comprising:
a terminal to which a resistor and a capacitor are coupled, and at which the detection voltage is outputted, wherein the first time period is longer than a time constant of the resistor and the capacitor.

4. The integrated circuit according to claim 2, wherein the signal output circuit includes a determination circuit configured to determine whether a time period during which the power consumption of the load is smaller than a first value continues for a second time period, based on the detection voltage and the reference voltage at the first level, and
an output circuit configured to
output the second signal when the time period during which the power consumption of the load is smaller than the first value continues for the second time period, and
output the first signal before the time period continues for the second time period, upon the detection voltage reaching the second level.

5. The integrated circuit according to claim 4, wherein the reference voltage circuit
outputs the reference voltage at the first level, at which the power consumption of the load is the first value,
outputs the reference voltage at the second level, at which the power consumption of the load is a second value greater than the first value.

6. The integrated circuit according to claim 5, wherein the detection voltage outputted by the load detection circuit corresponds to each of the first and second modes and rises with the increase in the power consumption of the load, and
the first level of the reference voltage is higher than the second level thereof.

7. The integrated circuit according to claim 4, wherein the reference voltage circuit
outputs the reference voltage at the first level, at which the power consumption of the load is the first value, and
outputs the reference voltage at the second level, at which the power consumption of the load is the first value.

8. The integrated circuit according to claim 1, wherein the reference voltage circuit outputs the reference voltage at the second level when a first time period has elapsed since receipt of the second signal.

9. The integrated circuit according to claim 1, wherein the reference voltage circuit outputs the reference voltage at a level according to an output signal of the signal output circuit when a first time period has elapsed since receipt of the output signal from the signal output circuit.

10. The integrated circuit according to claim 1, wherein the first mode is a mode in which the transistor is continuously driven, and
the second mode is a mode in which the transistor is driven such that a switching operation of continuously driving the transistor and a stop operation of stopping the switching operation are repeated.

11. A power supply circuit configured to generate an output voltage at a target level from an input voltage inputted thereto, the power supply circuit being configured to operate in an operation mode that is a first mode or a second mode, the power supply circuit comprising:
an inductor;
a transistor configured to control an inductor current flowing through the inductor; and
an integrated circuit configured to switch the transistor, the integrated circuit including
a load detection circuit configured to output a detection voltage corresponding to a power consumption of a load of the power supply circuit and corresponding to the operation mode of the power supply circuit, based on the inductor current,
a driver circuit configured to drive the transistor according to the operation mode of the power supply circuit, and a control circuit configured to so control the driver circuit that
  the power supply circuit operates in the second mode upon the detection voltage reaching a first level with a decrease in the power consumption of the load when the power supply circuit operates in the first mode, and
  the power supply circuit operates in the first mode upon the detection voltage reaching a second level with an increase in the power consumption of the load when the power supply circuit operates in the second mode, wherein
the control circuit includes
  a reference voltage circuit configured to output a reference voltage that is
    at the first level in response to a first signal for operating the power supply circuit in the first mode, and
    at the second level in response to a second signal for operating the power supply circuit in the second mode, and
  a signal output circuit configured to
    output the second signal upon the detection voltage reaching the first level with the decrease in the power consumption of the load, and
    output the first signal upon the detection voltage reaching the second level with the increase in the power consumption of the load.

\* \* \* \* \*